(12) United States Patent
Defrancq

(10) Patent No.: US 6,641,356 B1
(45) Date of Patent: Nov. 4, 2003

(54) FRONT LIFTING EQUIPMENT FOR CRAWLER TRACTOR, AND CRAWLER TRACTOR EQUIPPED THEREWITH

(76) Inventor: Hubert Defrancq, 2, Rue de Laon, Guignicourt (FR), F-02190

( * ) Notice: Subject to any disclaimer, the term of this patent is extended or adjusted under 35 U.S.C. 154(b) by 0 days.

(21) Appl. No.: 09/856,297
(22) PCT Filed: Nov. 12, 1999
(86) PCT No.: PCT/FR99/02777
§ 371 (c)(1), (2), (4) Date: May 21, 2001
(87) PCT Pub. No.: WO00/30918
PCT Pub. Date: Jun. 2, 2000

(30) Foreign Application Priority Data

Nov. 19, 1998 (FR) .......................... 98 14536

(51) Int. Cl.⁷ .............................. B66C 23/00
(52) U.S. Cl. ..................... 414/686; 414/680; 180/9.48; 180/906
(58) Field of Search ................ 414/680, 686; 180/906, 9.48

(56) References Cited

U.S. PATENT DOCUMENTS

| 4,078,616 | A | * | 3/1978 | Hisamatsu et al. | ......... 172/801 |
|---|---|---|---|---|---|
| 4,230,199 | A | | 10/1980 | Stedman | |
| 4,264,264 | A | * | 4/1981 | McMillan et al. | ........... 414/686 |
| 4,755,101 | A | * | 7/1988 | Hamada et al. | .............. 172/274 |
| 5,451,135 | A | * | 9/1995 | Schempf et al. | ............. 414/674 |
| 5,584,527 | A | * | 12/1996 | Sitter | .......................... 296/181 |
| 5,598,896 | A | * | 2/1997 | Haest | ........................ 180/9.48 |
| 5,638,908 | A | * | 6/1997 | Masumoto et al. | ......... 172/815 |
| 5,895,197 | A | * | 4/1999 | McVaugh | .................... 414/680 |
| 5,901,800 | A | * | 5/1999 | Wilson et al. | ............. 180/9.48 |
| 6,278,955 | B1 | * | 8/2001 | Hartman et al. | ............ 702/105 |

FOREIGN PATENT DOCUMENTS

DE          21 61 154          6/1973

* cited by examiner

Primary Examiner—Eileen D. Lillis
Assistant Examiner—Michael Lowe
(74) Attorney, Agent, or Firm—Young & Thompson

(57) ABSTRACT

A front lifting equipment for an agricultural crawler tractor with considerable offset (D) of the front art relatively to an intermediate girder (1) whereto are fixed the track-layer assemblies (Cg), an axle (4) being provided at the rear. The equipment includes a reinforcing member arranged on each side of the tractor, fixed to the intermediate girder and to the rear axle, and formed by a flank (18g) substantially parallel to the tractor median vertical plane, and whereof the height is arranged to ensure satisfactory mechanical resistance in spite of a reduced thickness such that adjusting the narrow gauge track of the tractor is not hindered. A link (L) between the front part (19g) of the reinforcing flank and a fixing point located towards the tractor front is provided for picking up effort.

13 Claims, 4 Drawing Sheets

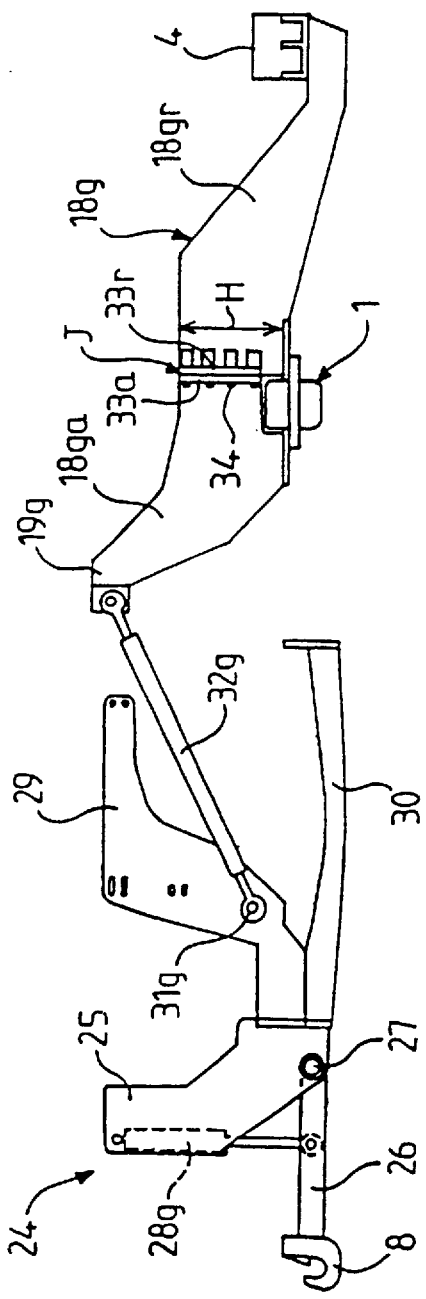
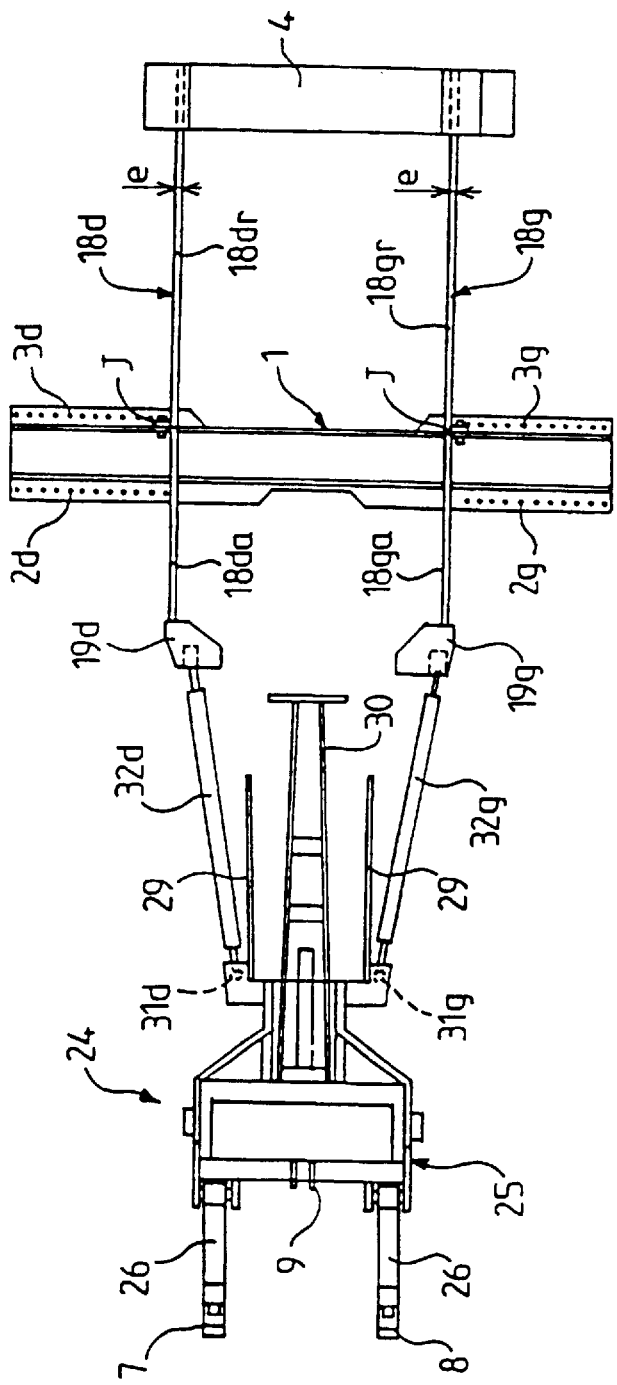

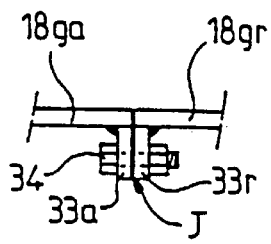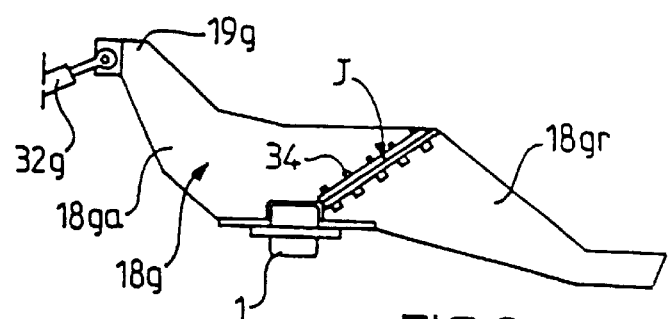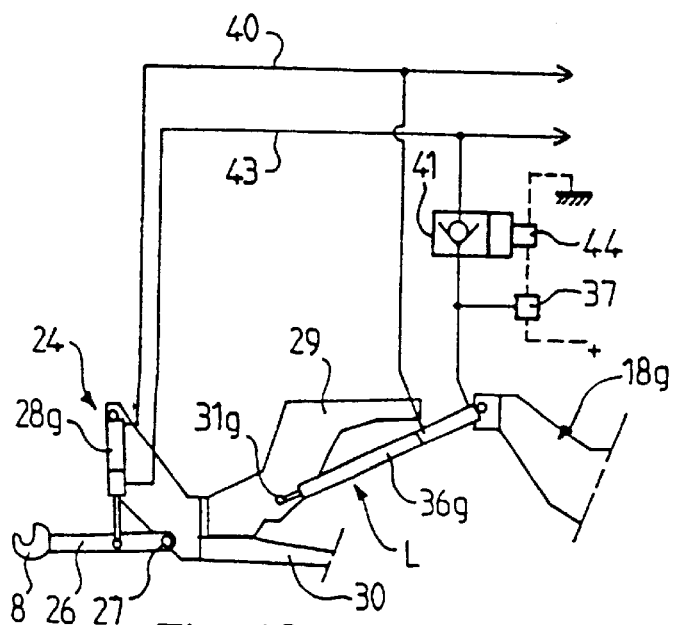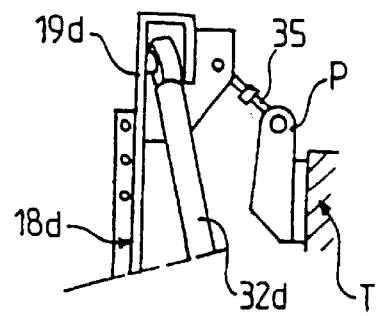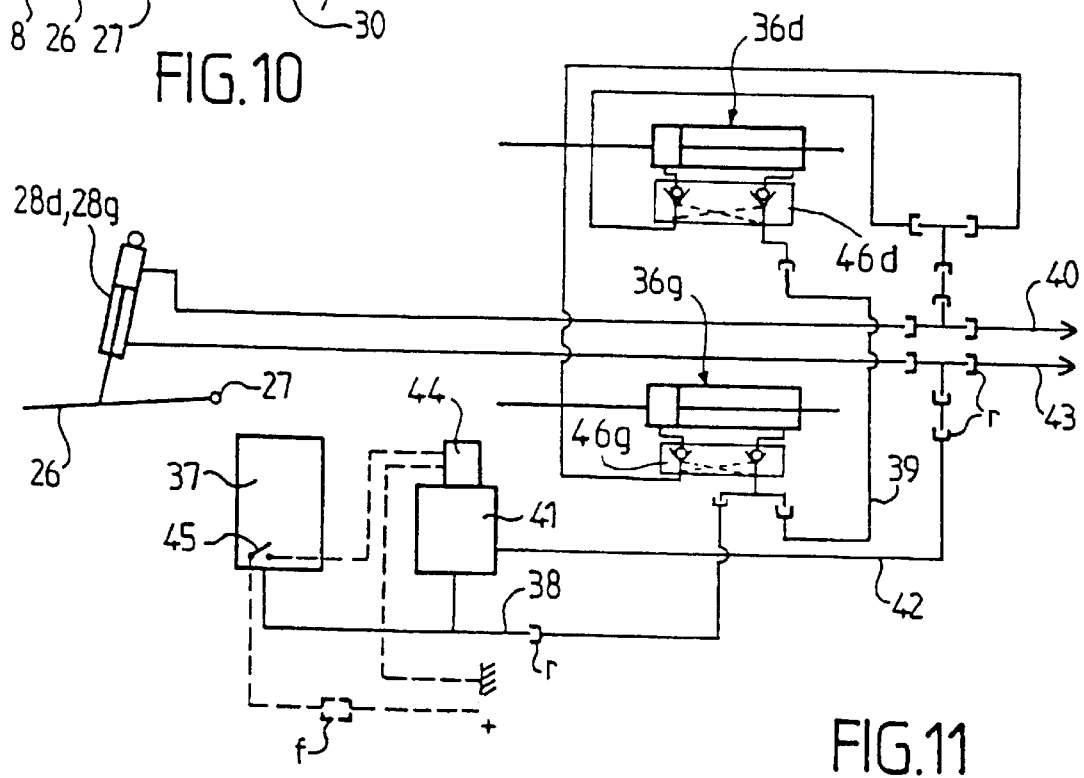

FRONT LIFTING EQUIPMENT FOR CRAWLER TRACTOR, AND CRAWLER TRACTOR EQUIPPED THEREWITH

The invention relates to front lift equipment for a crawler tractor, for agricultural use, which tractor has a substantial overhang of its front part relative to an intermediate transverse girder to which there is fixed, on each side, a crawler set, generally adjustable transversely to adjust the track of the tractor, there being an axle at the rear of the tractor, the equipment comprising a reinforcing member arranged on each side of the tractor, continuing forward beyond the intermediate girder, and means of connection between the front part of the reinforcing member and a point of attachment of a part subjected to the forces generated by a load acting on the front lift.

Current generations of crawler tractors for agricultural use have three main characteristics compared to the conventional versions of these tractors:
  rubber crawler tracks;
  a lower weight per kilowatt of power in order to avoid compacting the ground excessively;
  a substantial overhang of the front part of the tractor so that the tractor is balanced in spite of the nose-up moment created by an implement trailed behind the tractor, so as to ensure uniform contact of the crawlers to encourage the transmission of power and avoid compacting the ground.

The intermediate girder constitutes the furthest forward bearing element of the framework of the crawler tractor. This intermediate girder is practically mid-way along the length of the tractor. When a load is carried at the front of the tractor, a considerable bending moment is produced on that part of the tractor located forward of the intermediate girder. It is therefore necessary to be able to control this bending moment to avoid causing mechanical failure of the tractor.

A front lift is not installed as a matter of course on all crawler tractors. In order to avoid extra cost for the users of tractors not equipped with front lifts, and with a view to limiting the total weight of the tractor, tractor manufacturers do not organize the framework of the tractor according to the loadings created by any front lift that might be fitted.

It is therefore important that the manufacturers of front lifts, installed later, provide a structure for reinforcing the crawler tractor to prevent it from being subjected to unacceptable loadings. A reinforcing member arranged on each side of the tractor forms part of this reinforcing structure.

Such a reinforcing member leads to drawbacks, particular the following ones.

The crawler sets are adjustable, in the transverse direction, to make it possible to modify the track of the tractor. This adjustment is obtained by shifting the zone of attachment of the set along the intermediate girder. The presence of a reinforcing member located between the crawlers and the body of the tractor leads to a limitation on the amount of adjustment of the track of the tractor, particularly when the issue is one of setting this track to the minimum value.

Furthermore, the presence of a reinforcing member at the bottom of the tractor encourages the build-up of waste under the tractor.

The object of the invention is, above all, to provide a front lift equipment for a crawler tractor that makes it possible to avoid the abovementioned drawbacks while at the same time remaining relatively simple and economical in its structure and use, and at the same time providing the tractor with sufficient reinforcement.

According to the invention, a front lift equipment for a crawler tractor for agricultural use, of the above-defined kind, is characterized in that each reinforcing member has a flank of small thickness, roughly parallel to the vertical mid-plane of the tractor, located in the vicinity of the body of the tractor, the height of the flank being designed to provide satisfactory mechanical strength, the thickness of the flank being such that the setting of a narrow tractor crawler track is not impeded.

Advantageously the flank has a thickness not exceeding 50mm, particularly not exceeding 30mm.

The flank passes over and bears on the intermediate girder and is continued rearward to be connected to the rear axle.

The flank may be formed of two parts assembled by a joint, particularly an inclined joint. The joint is preferably located roughly at the level of the intermediate girder and the part of the flank located forward of the joint is thicker than the part of the flank located to the rear of the joint.

The front lift may comprise a supporting structure, particularly in the shape of an inverted U, carrying the three hitching points for an implement, this supporting structure being articulated, on each side, at the bottom rear part, to one end of a longeron which is articulated at its other end to a pivot carried by the framework of the tractor, the supporting structure being held on each side by a tensioning means, particularly a tensioning screw, provided between a high point on the supporting structure and a point secured to the longeron, the connecting means (L) being formed of rams allowing the raising or lowering of the longerons, and the supporting structure.

The tensioning screws may be equipped with a sliding part to allow longitudinal following of the relief.

According to another possibility, the equipment comprises a lift fixed to the front of the tractor, with rams and articulated arms, the articulation of the arms being located at the front of the tractor, and the connecting means are provided between the front top end of the flank and a point of attachment located further forward and lower down, secured to the framework of the tractor, particularly located on a part attached and fixed to the tractor and serving to attach the lift.

The connecting means advantageously converge from the rear forward.

There may be provided, on each side of the tractor, a link rod articulated, particularly on a ball joint, at each end to establish a transverse connection between the top front end of the flank and a point on the framework of the tractor so as to combat the transverse loadings that act on the front end of the flank.

Each connecting means may consist of a rigid bar, particularly a preloaded one.

According to an advantageous solution, the connecting means consist, on each side, of a ram supplied in parallel with the front lift rams.

A pressure sensor and a nonreturn valve controlled by the pressure sensor are advantageously located on the supply line of the rams forming connecting means so as to cut the communication between these rams and the lift rams when a given pressure value is exceeded.

The invention also relates to a crawler tractor equipped with front lift equipment as defined hereinabove.

Apart from the arrangements set out hereinabove, the invention consists in a certain number of other arrangements which will be dealt with more fully hereinafter with regard to some particular exemplary embodiments which are described in detail with reference to the drawings appended hereto but which are not in any way limiting.

FIG. 1 of these drawings is a schematic side view of the front of a crawler tractor equipped with a front lift equipment according to the invention.

FIG. 6 is a side view of the elements that make up the equipment of FIG. 5.

FIG. 7 is a view from above with respect to FIG. 6.

FIG. 8 is a view from above of the detail of the joint, on a larger scale.

FIG. 9 is a side view showing a variant of the joint.

FIG. 10 is a schematic side view of a variant of the equipment of FIG. 5.

FIG. 11 is a diagram of the hydraulic installation of FIG. 10.

Figure 5:
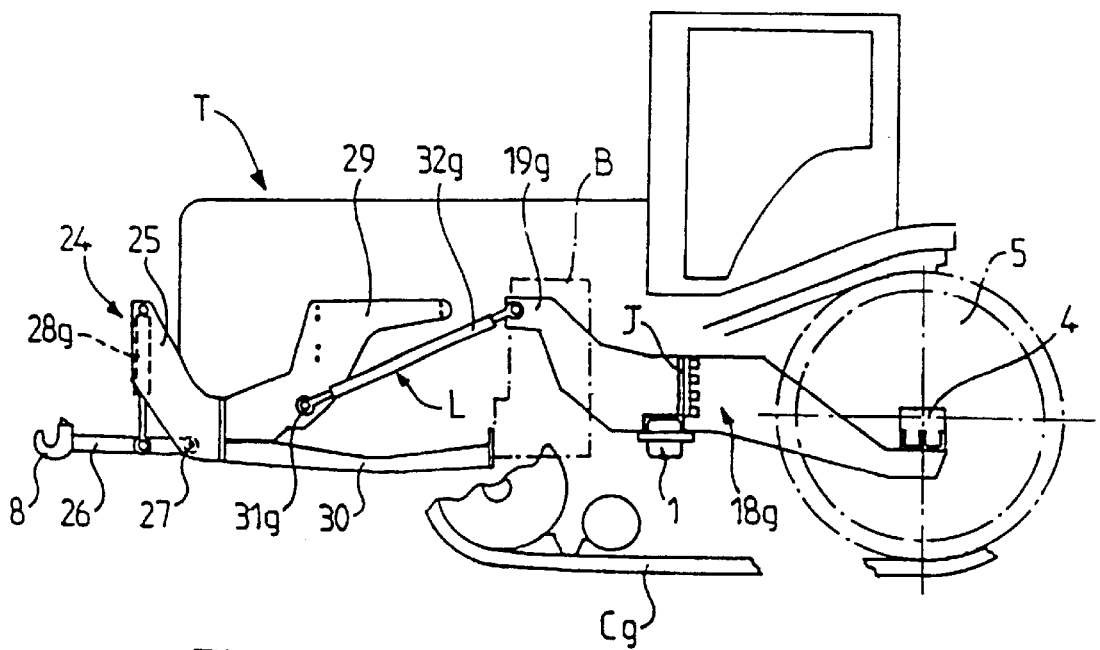
FIG. 5 is a schematic side view with parts removed, of a crawler tractor equipped with a variant of the front lift equipment.

Finally, FIG. 12 shows, on a larger scale, a detail viewed from the left with respect to FIG. 5.

Figure 1:
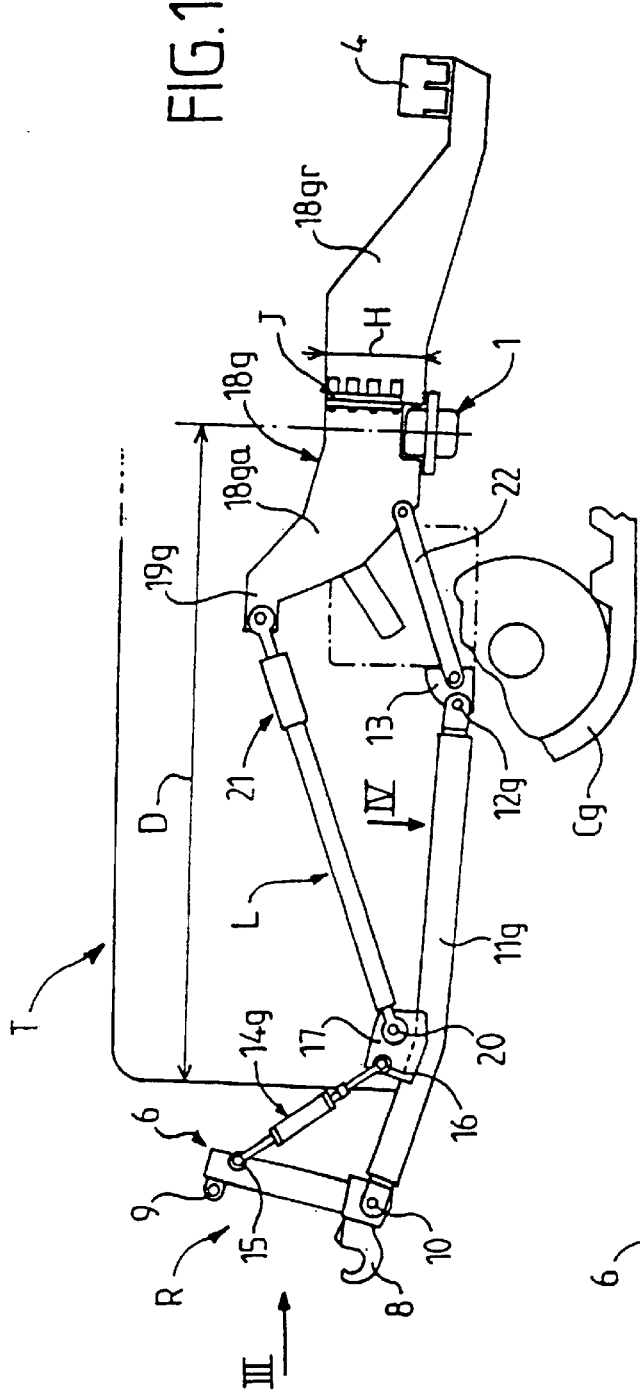
Figure 2:
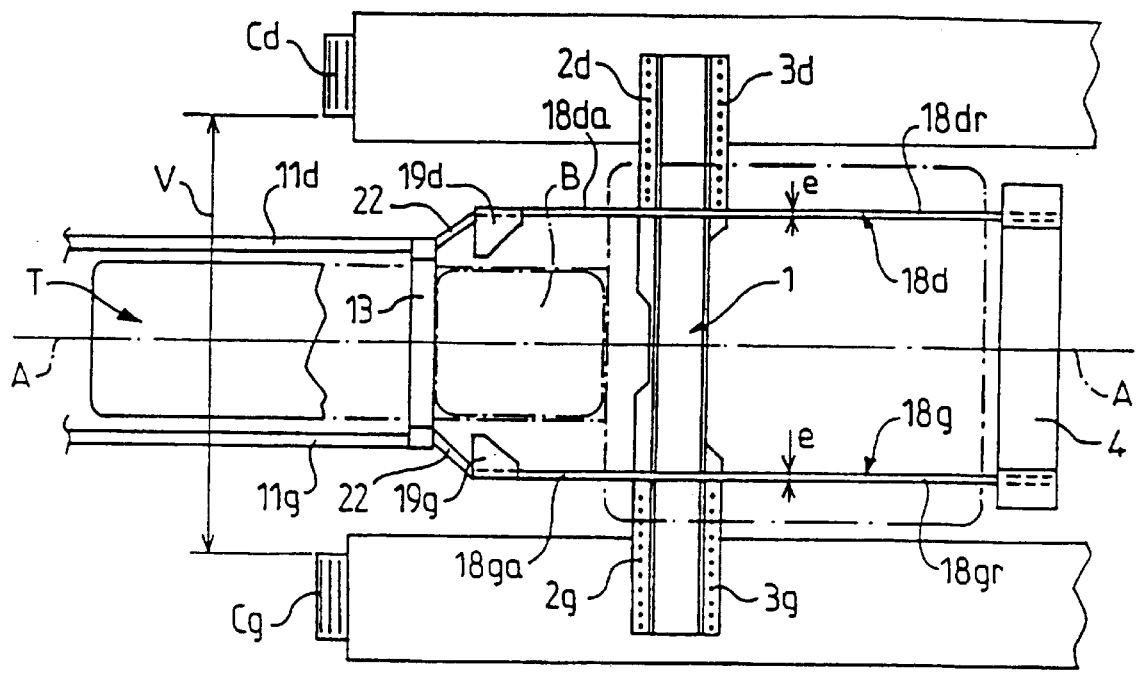
FIG. 2 is a schematic view from above of the part of the tractor of FIG. 1.

Referring to FIGS. 1 and 2 of the drawings, there may be seen a tractor T with crawler tracks Cd, Cg, which is intended for agriculture. This tractor has a substantial overhang D (FIG. 1) of its front part relative to an intermediate transverse girder 1 to which is fixed, on each side, a crawler set. The overhang D may be of the order of half the length of the tractor. The girder 1 is orthogonal to the longitudinal axis of the tractor, approximately mid-way along the length of the tractor, and constitutes the bearing element of the tractor framework located the furthest forward. As visible in FIG. 2, the extreme lateral zones of the girder 1 have, on their front and rear edges, a row of holes 2d, 2g and 3d, 3g to allow the corresponding crawler set Cd, Cg to be fixed at a greater or lesser distance away from the longitudinal axis A—A of the tractor. The track V can thus be altered and tailored to the separation of the rows of plants in a field in which the tractor is going to work.

There is an axle 4 at the rear of the tractor and supported, at each end, by a rear wheel 5 (see FIG. 5) of a crawler set.

Figure 3:
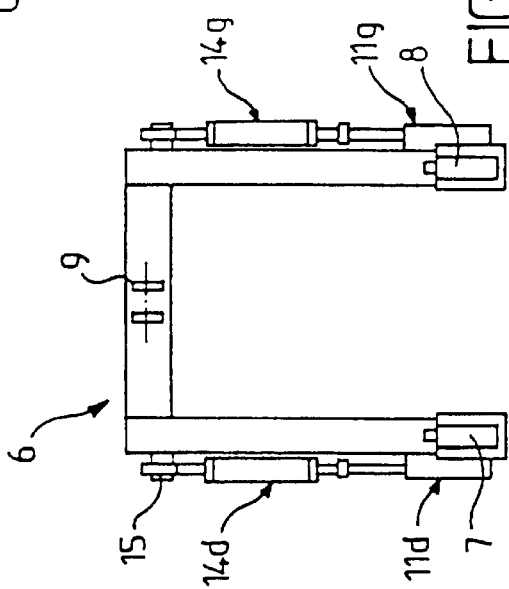
FIG. 3 is a view on a larger scale in the direction of arrow III of FIG. 1 of the front supporting structure with the three hitching points for an implement.

The tractor is fitted with a front lift R. This lift comprises a rigid supporting structure 6 carrying the three hitching points for an implement, namely two bottom hitching points 7, 8 formed by hitching irons and a central upper hitching point 9. The supporting structure 6 preferably has the shape of an inverted U as visible in FIG. 3. The supporting structure 6 is mounted, at the bottom, on each side, on an articulation 10, preferably a ball joint, located at the end of a longeron 11d, 11g.

Of course, the tractor T is generally also equipped with a rear lift (not depicted) for trailing an implement, while another implement is hitched at the front.

Each longeron 11d, 11g is articulated at its rear end on a pivot 12d, 12g, preferably a ball joint, carried by a transverse support 13 fixed to the front of a part of the framework of the tractor, for example to the front of the gearbox B.

The supporting structure 6 is held, on each side, by a tensioning screw 14d, 14g, preferably equipped with a ball joint at each end and attached to a high point 15 of the supporting structure and to a point 16 of the longeron. As a preference, the point of attachment 16 is on a plate 17 forming a gusset plate welded to the longeron in an approximately vertical plane. The tensioning screws 14d, 14g may be equipped with a sliding part to allow longitudinal following of the relief by the implement hitched to the structure 6, on account of the oscillation that this structure 6 can effect about the points 10.

A reinforcing member comprising flank 18d, 18g roughly parallel to the vertical mid-plane of the tractor is arranged on each side of the tractor and is fixed to the intermediate girder 1 and to the rear axle 4.

Each flank 18d, 18g is cut from a plate, generally of steel sheet, of a thickness e not exceeding 50 mm, and advantageously not exceeding 30 mm. The flank is positioned against the body of the tractor inside the crawler tracks Cd, Cg.

When viewed from the side (FIGS. 1, 5, 6 and 9) the reinforcing flank 18d, 18g has a shape resembling that of a seal, the raised head of which constitutes the front part 19d, 19g of the flank located forward of the girder 1 and higher up than this girder. The central part of the flank 18d, 18g has the greatest height H; this central part straddles the intermediate girdle 1 and rests on it. The flank 18d, 18g lowers toward the rear, forming a kind of tail, and extends as far as the rear axle 4 to which it is fixed.

The possibilities of adjusting the track V of the crawlers are not limited because of the slenderness of the reinforcing flanks 18d, 18g which still have sufficient bending strength because of their height H in the most heavily loaded region. This height H is preferably greater than 30 cm.

There is a means of connection L between the front top part 19d, 19g of the reinforcing flank and an attachment point 20 located on a part of the front of the tractor which part is subjected to the loading created by the load attached to the supporting structure 6.

According to the embodiment of FIGS. 1 and 2, the connecting means L consist, on each side, of a ram 21 allowing the raising or lowering of the longerons 11d, 11g and with them the supporting structure 6.

The rear part of the connecting means L is attached to the front part 19d, 19g of the flank. The tensile force exerted by the connecting means on the front top part 19d, 19g of the flank creates, relative to the girder 1, a moment which is balanced by the bearing reaction of the rear part of the flank with respect to the axle 4.

Advantageously, the attachment point 20 is provided on the gusset plate 17, slightly to the rear of the attachment point 16.

The gusset plates 17 provide an easy way of reinforcing the region of the longerons 11d, 11g where the stresses are concentrated.

As the rear part of the longerons 11d, 11g is articulated on a support 13 connected to the framework of the tractor, it is possible to optimize the manufacture of the frame consisting of the longerons 11d, 11g with reduced width so as to avoid interfering with the adjustability of the track of the crawler tracks.

A connecting bar 22 is provided on each side to connect a transverse end of the support 13 to the reinforcing element 18d, 18g so as to avoid the transmission of the lateral stresses experienced by the support 13 to the tractor and to stiffen the assembly.

A stiffening connection is provided between the two longerons 11d, 11g and this may consist of a transverse girder welded to these longerons toward the front end.

Figure 4:
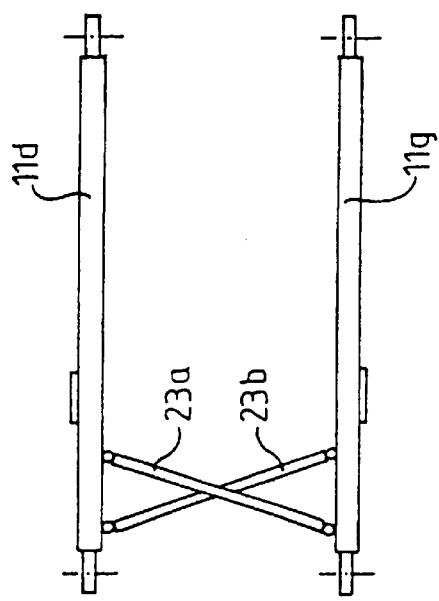
FIG. 4 is a view in the direction of arrow IV of FIG. 1 of the longerons with a stiffening connection.

This stiffening connection may also be achieved as illustrated in FIG. 4 using two crossed tensioning screws 23a, 23b connected respectively at each end to the longerons 11d, 11g by articulations, preferably of the ball joint type, allowing relative vertical movement of the longerons 11d, 11g.

Such a construction allows transverse following of the relief by the implement hitched to the front lift, provided that the tensioning screws 14d, 14g are equipped with a sliding part. The longerons 11d, 11g thus assembled form a frame.

The way in which such equipment behaves when a load is hitched to the front lift R results from the foregoing explanations.

Because the supporting structure 6 is mounted to pivot on the articulations 10 and because the top part of this structure is retained by the rearwardly inclined tensioning screws 14d, 14g, the bending stresses on the upper part of the supporting structure 6 are reduced and there is no concentration of stresses at the bottom part, that is to say at the level of the articulations 10.

The loadings created by a load (not depicted) hitched to the points 7, 8, 9, are transmitted by the connecting means L to be reinforcing flanks 18d, 18g and, by these flanks, to the strong bearing elements of the tractor, namely the intermediate girder 1 and the rear axle 4.

The flanks 18d, 18g have a small transverse dimension which avoids a build-up of waste under the tractor.

FIGS. 5 to 7 show an advantageous variant embodiment involving a front lift 24 similar to those used on wheeled tractors. Such a front lift makes it possible to benefit from satisfactory hitch geometry, particularly for hitching implements for working in the ground, and exhibits good mechanical strength.

The lift 24 comprises a supporting structure 25 fixed to the front of the tractor. On each side of the supporting structure, a lifting arm 23 projects forward, this arm being articulated at 27 at its rear end to the supporting structure 25 practically at the level of the front end of the tractor T. The bottom hitching points 7, 8 for the implement are located at the front ends of the arms 26. A ram 28d, 28g, preferably approximately vertical, is provided on each side of the lift 24 between a top hitching point of the supporting structure 25 and a bottom hitching point on the corresponding arm 26.

The supporting structure 25 is fixed at the rear, on each side of the tractor, to an attached plate 29 fixed by screws to the framework of the tractor. A thrust girder 30, located along the axis of the tractor, is fixed at its front end to the bottom rear part of the supporting structure 25. The other end of the girder 30 is fixed to a rigid wall of the framework of the tractor, for example to the gearbox B.

Again, on each side of the tractor, there are the reinforcing flanks 18d, 18g straddling the intermediate girder 1 and bearing via their continuation relative to the rear axle 4. The front top end 19d, 19g of the reinforcing flank is connected by the connecting means L to an attachment point 31d, 31g secured to the framework of the tractor T and located toward the front, at the bottom. The attachment point 31d, 31g may be on the plate 29 itself fixed to the framework of the tractor.

Each connecting means L consists of a bar 32d, 32g, preferably a preloaded one.

The connection of each end of the bar 32g to the part 19g and to the point 31g is advantageously by means of a ball joint. The same is true of the other bar 32d.

As a preference, as visible in FIG. 7, the two bars 32d, 32g converge downward, which gives the assembly resistance to transverse forces.

The bars 32d, 32g act as preloaded tensioners and have the function of holding the front part of the tractor and of preventing the bending induced by a load supported by the lift 24.

The size of the parts of the tractor poses problems with installing the flanks 18d, 18g against the body of the tractor, inside the crawler tracks.

In order to install flanks 18d, 18g of sufficient height, each flank consists of two parts 18da, 18dr and 18ga, 18gr joined together by a joint J located approximately at the level of the rear face of the intermediate girder 1.

Because of the slenderness of the flank, the joint J, as illustrated in FIG. 8, has strips 33a, 33r, advantageously strengthened with gussets, which are vertical, the plane of which is perpendicular to that of the flank. These strips are welded to the edges of the parts 18ga and 18gr and have passing through them holes through which assembly bolts 34 pass.

Instead of arranging the joint J vertically as illustrated in FIG. 6, it can be arranged in an inclined direction as illustrated in FIG. 9. The length of the joint J is therefore increased and the number of assembly bolts 34 is greater than in the arrangement of FIG. 6 which means that the mechanical strength of the joint J is improved.

The part 18da, 18ga of the flank located forward of the joint J is more highly stressed than the part 18dr, 18gr of the flank located to the rear of the joint J. The thickness of the rear part 18dr, 18gr may be less than that of the front part.

As visible in FIG. 7, the bars 32d, 32g which work at an angle with respect to the direction of travel of the tractor (this allows improved resistance to lateral loadings) do, however, give rise to lateral bending moments on the front part 19d, 19g of the reinforcing flank.

To avoid the bending caused by such forces, a link rod 35 is provided (see FIG. 12) and this connects the front end 19g, 19d to a point of attachment P on the structure of the tractor, the link rod 35 being articulated at each of its ends. This link rod 35 is located roughly in a transverse vertical plane perpendicular to the direction of travel of the tractor. Furthermore, the link rod 35 is preferably inclined at about 45° to the horizontal, the point P being the low point.

When stress is applied to the flank 18d, 18g, the deformation is controlled so that it is only in longitudinal direction without giving rise to shear stress on the structure of the tractor.

The setup described above with reference to FIGS. 5 to 7, with bars 32d, 32g, particularly preloaded ones, is advantageous but works essentially with front lifts 24 used as single-acting devices, that is to say subjected to a force which urges the arms 26 downward (the counterclockwise direction in FIG. 5).

When using double-acting implements, for example a "front press" or "bulldozer blade", the force exerted on the arms 26 may be reversed and be directed upward. The force therefore tends to lift the front end of the tractor. In such a case, if the bar 32d, 32g is preloaded, this preload combines with the force induced by the front lift and may lead to excessive reverse stresses.

The variant of FIGS. 10 and 11 is aimed at solving this problem. The connecting means L no longer consist of preloaded bars but consist of rams 36d, 36g supplied in parallel with the rams 28d, 28g of the front lift 24.

The rams 36d, 36g act as tensioners and are dimensioned according to the cross section of the lift rams 28d, 28g.

The mechanical tension applied by the rams 36d, 36g is therefore proportional to the load applied to the front lift 24, regardless of the direction of operation.

However, the particular geometry of a front lift for a given load gives rise to an increase in the pressure in the rams 28d, 28g of the lift the more the load is raised by the arms 26. This being the case, there is a risk that an excessively high liquid pressure will be applied to the tensioning rams 36d, 36g when the load hitched to the front lift 27 reaches a relatively high position.

To avoid this drawback, there is provided, as illustrated in FIG. 11, a pressure sensor 37 connected to a pipe 38 connected to a pipe 39 itself connecting a chamber, for example the chamber on the rod side of the ram 36d, to its counterpart in the ram 36g. The chambers of the rams 36d, 36g located on the other side of the pistons are connected in parallel to a pipe 40 for discharging the oil to a low-pressure reservoir or reservoir at atmospheric pressure.

The pipe 38 is connected by a nonreturn valve 41 to a line 42 connected to a line 43 conveying pressurized oil to the rams 28d, 28g of the front lift in order to raise the arms 26.

The various connections between lengths of pipe are shown schematically and depicted by r.

The nonreturn valve 41 is driven hydraulically, or electrically as illustrated in FIG. 11, by the pressure sensor 37.

Electric drive of the valve 41 is provided by an electromagnetic coil 44, whose electrical supply from the positive pole of a battery (not depicted) is provided by an electric contact 45 connected to the supply line of the coil 44. The other terminal of the coil 44 is grounded. The closure or opening of the contact 45 is controlled by the pressure sensor 37.

The way in which the hydraulic installation of FIGS. 10 and 11 works is as follows.

When the pressure in the pipe 43, that is to say in the rams 28d, 28g of the front lift 24 exceeds a given threshold, the pressure sensor 37, subjected to this pressure present in the pipes 42 and 38, commands closure of the contact 45. This brings the nonreturn valve 41 into action and this valve isolates the pipe 38 from the pipe 42. The rams 36d, 36g are thus isolated from the lifting rams 28d, 28g so as to avoid a needless increase in the mechanical tension produced by the rams 36d, 36g.

When the pressure in the lifting rams 28d, 28g drops to a value below the pressure set by the sensor 37, the oil is once again exchanged freely between the lift rams 28d, 28g and tensioning rams 36d, 36g.

Provision is made for the ram 36d located on the right-hand side and the ram 36g located on the left-hand side to be controlled in parallel in order to benefit from the lateral stiffening provided by the tensioning rams 36d, 36g when they work independently. What happens is that if the chambers of the rams 36d, 36g are in communication by the line 39, the stiffening disappears because there is a transfer of liquid from one tensioning ram to the other.

In order to control the tensioning rams in parallel, all that is necessary is (as illustrated in FIG. 11) for a double nonreturn valve, driven hydraulically, 46d, 46g to be installed on each tensioning ram 36d, 36g which then operates independently of the other. In the event of lateral forces, an increase in pressure in one of the tensioning rams 36d or 36g is not transmitted to the other tensioning ram 36g or 36d because the corresponding nonreturn valve prevents any flow from one chamber of one of the tensioning rams to one chamber of the other tensioning ram. By virtue of the control, the operation of each tensioning ram from the pipes 43 and 40 is unchanged.

What is claimed is:

1. Front lift equipment for a crawler tractor, for agricultural use, having a substantial overhang of its front part relative to an intermediate transverse girder which constitutes the farthest forward bearing element of the tractor framework, to which there is fixed, on each side, a crawler set, adjustable transversely to adjust the track of the tractor, there being an axle at the rear of the tractor, a reinforcing member arranged on each side of the tractor and fixed to the intermediate girder and to the rear axle, and connecting means between the reinforcing member and a point of attachment of a part subjected to the forces generated by a load, a supporting structure (25) fixed to the front of the tractor with, on each side of the supporting structure, a lifting arm (26) projecting forward, this arm being articulated at its rear end (27) to the supporting structure which is fixed at the rear, on each side of the tractor, to a plate (29) fixed to the framework of the tractor, each reinforcing member having a flank (18d, 18g) of small thickness (e), roughly parallel to the vertical mid-plane of the tractor, located in the vicinity of the body of the tractor inside the crawler tracks (Cd, Cg), the height of the flank being designed to provide satisfactory mechanical strength, the thickness (e) of the flank (18d, 18g) being such that the setting of a narrow tractor crawler track is not impeded, said connecting means (L) extending between a front top end (19d, 19g) of said flank and a point of attachment (31d, 31g) located farther forward and lower down and secured to framework of the tractor.

2. Equipment according to claim 1, characterized in that the flank (18d, 18g) has a thickness (e) not exceeding 50 millimeters.

3. Equipment according to claim 1, characterized in that the flank (18d, 18g) passes over and bears on the intermediate girder (1) and is continued rearward to be connected to the rear axle (4).

4. Equipment according to claim 1, characterized in that the flank (18d, 18g) is formed of two parts (18da, 18dr; 18ga, 18gr) assembled by a joint (J).

5. Equipment according to claim 4, characterized in that the joint is located approximately at the level of the intermediate girder (1) and in that the part (18da, 18ga) of the flank located forward of the joint (J) is thicker than the part (18dr, 18gr) of the flank located to the rear of the joint (J).

6. Equipment according to claim 1, characterized in that a lift (24) with rams (28d, 28g) and articulated arms (26) is fixed to the front of the tractor, the articulation (27) of the arms being located at the front of the tractor.

7. Equipment according to claim 6, characterized in that the connecting means (L; 32d, 32g; 36d, 36g) converge from the rear forward.

8. Equipment according to claim 6, characterized in that a link rod (35) articulated at each end, establishes a transverse connection between the top front end (19d, 19g) of the flank and a point (P) on the framework of the tractor.

9. Equipment according to claim 6, characterized in that the connecting means (L) comprise, on each side, a rigid bar (32d, 32g).

10. Equipment according to claim 6, characterized in that the connecting means (L) comprise, on each side, a ram (36d, 36g) supplied in parallel with the rams (28d, 28g) of the lift (24).

11. Equipment according to claim 10, characterized in that a pressure sensor (37) and a nonreturn valve (41) controlled by the pressure sensor (37) are located on a supply line (38, 42) of the ram (36d, 36g) forming the connecting means, so as to cut the communication with the lift ram (28d, 28g) when a given pressure value is exceeded.

12. Crawler tractor for agricultural use, characterized in that it is equipped with front lift equipment according to claim 1.

13. Equipment according to claim 1, characterized in that it comprises a link rod (35) connecting the front top end (19d, 19g) of a flank (18d, 18g) to a point of attachment (P) on the structure of the tractor, the link rod (35) being located substantially in a transverse vertical plane perpendicular to the direction of travel of the tractor.

* * * * *